US012767013B2

(12) United States Patent
Quast et al.

(10) Patent No.: US 12,767,013 B2
(45) Date of Patent: Oct. 20, 2026

(54) LONGITUDINAL ADJUSTER AND VEHICLE SEAT

(71) Applicant: Adient US LLC, Plymouth, MI (US)

(72) Inventors: Ingo Quast, Dusseldorf (DE); Erik Sprenger, Wermelskirchen (DE)

(73) Assignee: Adient US LLC, Plymouth, MI (US)

( * ) Notice: Subject to any disclaimer, the term of this patent is extended or adjusted under 35 U.S.C. 154(b) by 88 days.

(21) Appl. No.: 18/861,242

(22) PCT Filed: May 31, 2023

(86) PCT No.: PCT/IB2023/055564
§ 371 (c)(1),
(2) Date: Oct. 29, 2024

(87) PCT Pub. No.: WO2023/233312
PCT Pub. Date: Dec. 7, 2023

(65) Prior Publication Data

US 2025/0332964 A1 Oct. 30, 2025

(30) Foreign Application Priority Data

May 31, 2022 (DE) ..................... 10 2022 205 470.9
Aug. 26, 2022 (DE) ..................... 10 2022 208 884.0

(51) Int. Cl.
*B60N 2/06* (2006.01)
*B60N 2/02* (2006.01)
*B60N 2/07* (2006.01)

(52) U.S. Cl.
CPC ......... *B60N 2/067* (2013.01); *B60N 2/02253* (2023.08); *B60N 2/0722* (2013.01)

(58) Field of Classification Search
CPC ................ B60N 2/067; B60N 2/02253; B60N 2/0722
See application file for complete search history.

(56) References Cited

U.S. PATENT DOCUMENTS 6,260,922 B1 * 7/2001 Frohnhaus ............. B60N 2/067 248/424
8,348,326 B2 * 1/2013 Koga ................. B60N 2/02246 296/96.13

(Continued)

FOREIGN PATENT DOCUMENTS

DE 102017218492 A1 2/2019
JP 2010047090 A 3/2010

OTHER PUBLICATIONS

European Patent Office, International Search Report and Written Opinion in Application No. PCT/IB2023/055564, dated Sep. 12, 2023, 9 pages, Rijswijk, Netherlands.

*Primary Examiner* — Philip F Gabler
(74) *Attorney, Agent, or Firm* — Marshall & Melhorn LLC

(57) ABSTRACT

A longitudinal adjuster may have a pair of rails and a drive device for the rails. The pair of rails may be a first rail and a second rail. The drive device may have at least one motor, a transmission unit, a spindle block that is fixed to the first rail or second rail, a spindle, and a spindle bearing. The spindle may extend along a longitudinal axis and may be mounted in the spindle block and the spindle bearing to be rotatable about a spindle axis. The spindle bearing has at least one spindle nut which may be fastened to the spindle and rotates together with the latter. A vehicle seat may have the longitudinal adjuster and the spindle bearing has, in an axial direction, a ball bearing and a slide bushing with axial play with respect to the spindle nut.

15 Claims, 4 Drawing Sheets

(56) References Cited

U.S. PATENT DOCUMENTS

| | | | | |
|---|---|---|---|---|
| 8,826,756 | B2 * | 9/2014 | Hoffmann | B29C 66/344<br>74/89.34 |
| 11,603,016 | B2 * | 3/2023 | Imamura | F16H 57/0025 |
| 11,607,974 | B2 * | 3/2023 | Wang | B60N 2/02246 |
| 2008/0163712 | A1 * | 7/2008 | Oberle | F16H 57/039<br>74/424 |
| 2019/0381915 | A1 * | 12/2019 | Taniguchi | B60N 2/0705 |
| 2024/0317116 | A1 * | 9/2024 | Sprenger | B60N 2/067 |
| 2024/0399935 | A1 * | 12/2024 | Quast | F16C 33/588 |
| 2025/0091484 | A1 * | 3/2025 | Adamczyk | B60N 2/02246 |
| 2025/0187498 | A1 * | 6/2025 | Quast | B60N 2/067 |
| 2025/0332964 | A1 * | 10/2025 | Quast | B60N 2/0722 |
| 2025/0360844 | A1 * | 11/2025 | Quast | B60N 2/02253 |

* cited by examiner

LONGITUDINAL ADJUSTER AND VEHICLE SEAT

FIELD

The invention relates to a longitudinal adjuster for a vehicle seat, in particular a motor vehicle seat. Furthermore, the invention relates to a vehicle seat.

BACKGROUND

DE 10 2017 218 492 A1 has disclosed a longitudinal adjuster, in particular for a vehicle seat. The longitudinal adjuster has at least one rail pair which is formed from a first rail and a second rail which is displaceable in the longitudinal direction relative to the first rail, wherein the rails engage around each other mutually with the formation of an inner channel. A spindle nut which is mounted with the second rail and a spindle which is operatively connected to the spindle nut are arranged in the inner channel, wherein a gear which is drivable by means of a motor and interacts with the spindle is arranged at one end of the first rail. The spindle is mounted at a front end portion of the spindle in the gear and at a rear end portion of the spindle in a rotary bearing of the first rail. A first crossbar is received in a slot of the first rail in front of the spindle nut in the longitudinal direction, wherein the spindle is guided through an opening of the first crossbar in a contact-free manner, in particular with the formation of a peripheral gap, wherein a shoulder of the spindle is arranged spaced apart from the first crossbar toward the front in the longitudinal direction, wherein the first crossbar jams between the first rail and the shoulder in a reaction to a predefined action of force, for example in the case of a crash, in particular by way of a displacement of the first rail, and a force can be dissipated as a result from the first rail via the first crossbar, the shoulder, the spindle and the spindle nut as far as the second rail.

US 2019/0381915 A1 and DE 10 2017 218 492 A1, for example, have disclosed further longitudinal adjusters.

SUMMARY

The invention is based on the problem of improving a longitudinal adjuster of the type mentioned at the outset, in particular of proposing an electrically drivable longitudinal adjuster with an integrated motor gear unit, and of providing a corresponding vehicle seat.

With regard to the longitudinal adjuster, and with regard to the vehicle seat, the problem is solved according to the invention by way of the features of the patent claims described herein.

Developments of the invention are the subject matter of the dependent patent claims.

According to the invention, the first-mentioned problem is solved by way of a longitudinal adjuster for a vehicle seat, in particular a motor vehicle seat, wherein the longitudinal adjuster has at least one rail pair which has a first rail, in particular a seat rail which is connectable to the vehicle seat, and a second rail, in particular a floor rail which is connectable to a vehicle floor and on which the first rail, in particular the seat rail, is guided displaceably, wherein the longitudinal adjuster has a drive device for adjusting the seat rail relative to the floor rail, and the drive device has at least one motor, a gear unit, a spindle block which is fixed with respect to the first rail (also called seat rail) or with respect to the second rail (also called floor rail) and has an internal thread, and a spindle which has an external thread which is operatively connected to the internal thread of the spindle block, and the spindle extends along a longitudinal axis and is mounted in the spindle block and a spindle bearing rotatably about the spindle axis, wherein the spindle bearing has at least one spindle nut which is fastened on the spindle and rotates with the latter, wherein the spindle bearing is configured as an axial bearing which transmits a linear movement of the spindle, in particular via a bracket, to the seat rail. In the axial direction, the spindle bearing has firstly a ball bearing and secondly a sliding bush with an axial play with respect to the spindle nut.

For example, the sliding bush can be arranged in front of the ball bearing, as viewed in the direction of travel. A rearward or rear arrangement of this type of the ball bearing has a high efficiency of the longitudinal adjuster, with the result that a small and low-performance drive can be used.

In a further example, the ball bearing can be arranged in front of the sliding bush in the direction of travel. A rearward arrangement of this type of the sliding bush enables, in the case of a displacement of the vehicle seat, a mechanical synchronization of two longitudinal adjusters which are arranged parallel to one another, in particular of two movable rails of these longitudinal adjusters.

By way of a rearward arrangement of this type of the sliding bush and its axial play, for example, the spindle bearing in a simple manner enables rail adjustments, which are unequal in the case of a displacement of the vehicle seat in the axial direction toward the front or the rear as a consequence of different mechanical loads, in particular different friction forces, to be synchronized or compensated for.

In particular, a spindle bearing of this type enables a synchronization of two adjustable rails of the longitudinal adjusters which are arranged parallel to one another in the case of a longitudinal adjustment of the vehicle seat without an electronics system, by way of the front (as viewed in the direction of travel) ball bearing which is configured as an axial ball bearing and the rear sliding bush with an axial play as bearing bush. For example, leading of one of the rails, in particular a movable upper rail, increases the pressure on the rear or rearward sliding bush (=bearing bush) and therefore the friction. In contrast, the trailing other rail, in particular a further movable upper rail, receives pressure on the axial ball bearing which lies at the front in the direction of travel and, as a consequence, less friction. On account of its reinforcement, the vehicle seat ensures the pressure build-up. In the case of an electronics-free synchronizable design of this type of a seat longitudinal adjusting mechanism with two longitudinal adjusters which are, in particular, structurally the same or identical, high-power motors are provided as drive devices.

In particular, no radial forces or only small radial forces are absorbed by means of a spindle bearing of this type. A spindle bearing which is configured as an axial bearing is understood to mean, in particular, a thrust bearing which can absorb an axial load, in particular a load in the axial direction along the longitudinal axis of the spindle.

The spindle nut is fastened on the spindle such that it cannot rotate. The linear movement of the spindle can be transmitted via the spindle bearing, configured as an axial bearing, for example directly to the seat rail or indirectly via a bracket to the seat rail. For example, the spindle bearing which is configured as an axial bearing is arranged between the spindle nut and the seat rail. In the case of an indirect transmission of the linear movement via the bracket, the spindle bearing which is configured as an axial bearing is arranged between the spindle nut and the bracket.

The axial bearing can bear, for example, against the bracket. In particular, the axial bearing can be mounted rotatably on the bracket. The bracket is in turn fastened to the seat rail.

In addition, a sliding bush can be provided between the spindle nut and the bracket. For example, the sliding bush can be arranged without stress in the axial direction and the radial direction between the spindle nut and the bracket. In particular, the sliding bush can be arranged both in the axial direction and in the radial direction with a play between the spindle nut and the bracket. A sliding bush of this type serves to absorb and to damp or to dissipate radial forces which act.

Moreover, two spindle nuts which are secured against rotation (also called single nuts) can be provided for the spindle, wherein, in the case of two spindle nuts, the spindle bearing which is configured as an axial bearing is arranged between these two spindle nuts.

The axial play can be provided, for example, between one of the two spindle nuts and the sliding bush. The spindle bearing has a single-sided axial play between one of the spindle nuts and the sliding bush. The ball bearing can be arranged, for example, between the other spindle nut and the bracket. In so far as an axial play is provided, this axial play can also arise on the ball bearing side.

The ball bearing can be arranged between the spindle nut and the spindle bearing in a preloaded manner, for example, by means of a spring element. For example, the ball bearing can be braced axially between an inner ring and an outer ring by means of the spring element and can therefore be mounted without play. In this exemplary embodiment, no play occurs between the bearing bush and the bracket either.

For example, the bracket can have a through opening, into which the sliding bush is pushed in such a way that the play between the sliding bush and the spindle nut is settable or is set. The spacing between the rotationally locked nuts (also called spindle nuts or single nuts) can be, for example, of constant configuration. An intermediate space which is formed by way of this constant spacing can be used for the bracket, a bearing bush collar and the ball bearing with or without axial play. If an additional spring (spring element), for example, is provided in the case of the ball bearing, this ensures a freedom from play of the arrangement of nuts, bracket, ball bearing and bearing bush collar.

According to the invention, the second-mentioned problem is solved by way of a vehicle seat which comprises the above-described longitudinal adjuster.

Moreover, a further identical or structurally identical longitudinal adjuster can be provided with an identical rail pair with an identical drive device, in particular a direct drive, wherein an undesired non-synchronous adjustment of the second rail of the one rail pair of the one longitudinal adjuster with respect to the second rail of the other rail pair of the other longitudinal adjuster is partially compensatable for by means of the axial play.

The advantages which are achieved by way of the invention consist, in particular, in that a highly efficient, in particular low-friction, spindle mounting, or a spindle mounting which compensates at least in regions for different adjusting movements, is made possible by means of the spindle bearing with axial play.

DESCRIPTION OF THE FIGURES

In the following text, the invention is explained in greater detail on the basis of advantageous exemplary embodiments which are shown in the figures. The invention is not restricted to these exemplary embodiments, however. In the figures.

DETAILED DESCRIPTION

Figure 1:
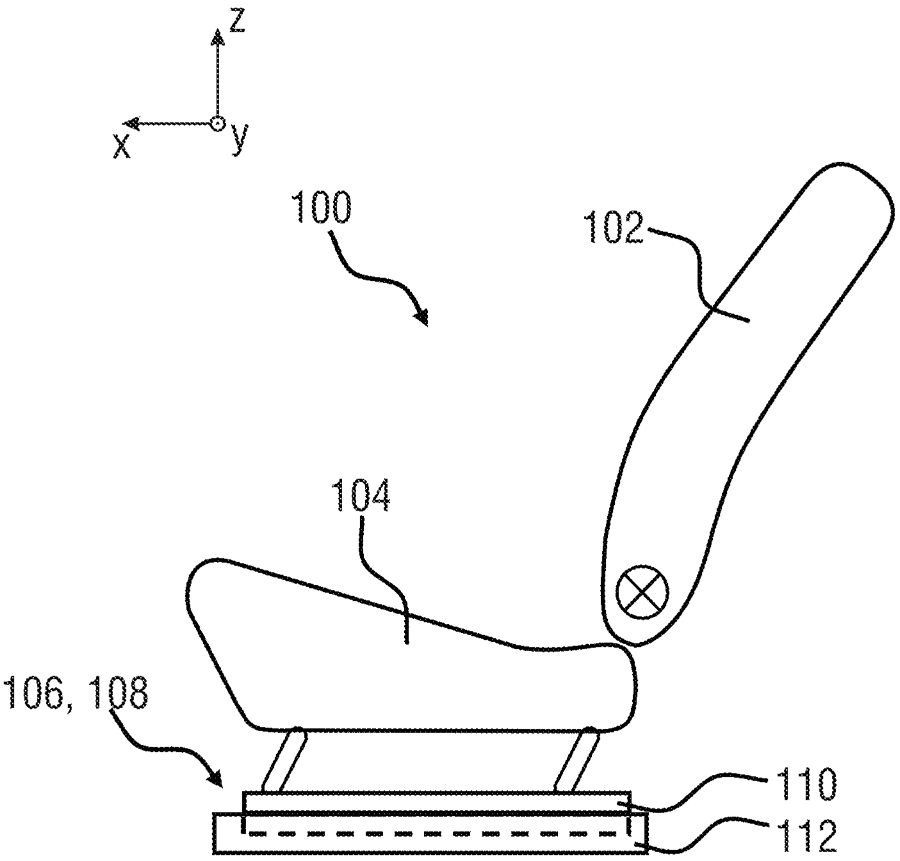
FIG. 1 diagrammatically shows a vehicle seat according to the invention with a longitudinal adjuster according to the invention.

Parts which correspond to one another are provided with the same designations in all figures.

A vehicle seat 100 (shown diagrammatically in FIG. 1) in accordance with a first exemplary embodiment is described in the following text using three spatial directions which run perpendicularly with respect to one another. In the case of a vehicle seat 100 which is installed in the vehicle, a longitudinal direction x runs largely horizontally and preferably parallel to a vehicle longitudinal direction which corresponds to the usual direction of travel of the vehicle. A lateral direction y which runs perpendicularly with respect to the longitudinal direction x is likewise oriented horizontally in the vehicle and runs parallel to a vehicle lateral direction. A vertical direction z runs perpendicularly with respect to the longitudinal direction x and perpendicularly with respect to the lateral direction y. In the case of a vehicle seat 100 which is installed in the vehicle, the vertical direction z runs parallel to the vehicle vertical axis.

The positional information and directional information used such as, for example, front, rear, top and bottom relate to a viewing direction of an occupant seated in a vehicle seat 100 in a normal seat position, wherein the vehicle seat 100 is installed in the vehicle, is oriented in a use position, suitable for passenger transportation, with an upright backrest 102, and is oriented in the direction of travel as is customary. The vehicle seat 100 according to the invention can also be installed, however, in a different orientation, for example transversely with respect to the direction of travel.

The vehicle seat 100 has a seat part 104 and the backrest 102 which is adjustable in terms of its inclination relative to the seat part 104 and is pivotable forward in the direction of the seat part 104. The vehicle seat 100 has a longitudinal adjuster 106 for the longitudinally displaceable and longitudinally adjustable attachment of the vehicle seat 100 in the vehicle.

The longitudinal adjuster 106 serves for longitudinal adjustment, that is to say the adjustment of a seat longitudinal position, of the vehicle seat 100. The vehicle seat 100 preferably has in each case one longitudinal adjuster 106 on each vehicle seat side. A first longitudinal adjuster 106 is arranged on a tunnel side and a second longitudinal adjuster 106 is arranged on a sill side. The two longitudinal adjusters 106 of the vehicle seat 100 run parallel to one another. The vehicle seat 100 preferably has two structurally identical longitudinal adjusters 106.

The respective longitudinal adjuster 106 comprises a rail pair 108 which has a first rail which is connectable to the vehicle seat 100, in particular a seat rail 110, and a second rail which is connectable to a vehicle floor, in particular a floor rail 112, on which the seat rail 110 is guided displaceably.

The two longitudinal adjusters 106 can be adjustable in a manner which is synchronized with respect to one another, in particular electronically, or else mechanically via flex-shafts. In the following text, only one of the two structurally identical longitudinal adjusters 106 is described.

Figure 2:
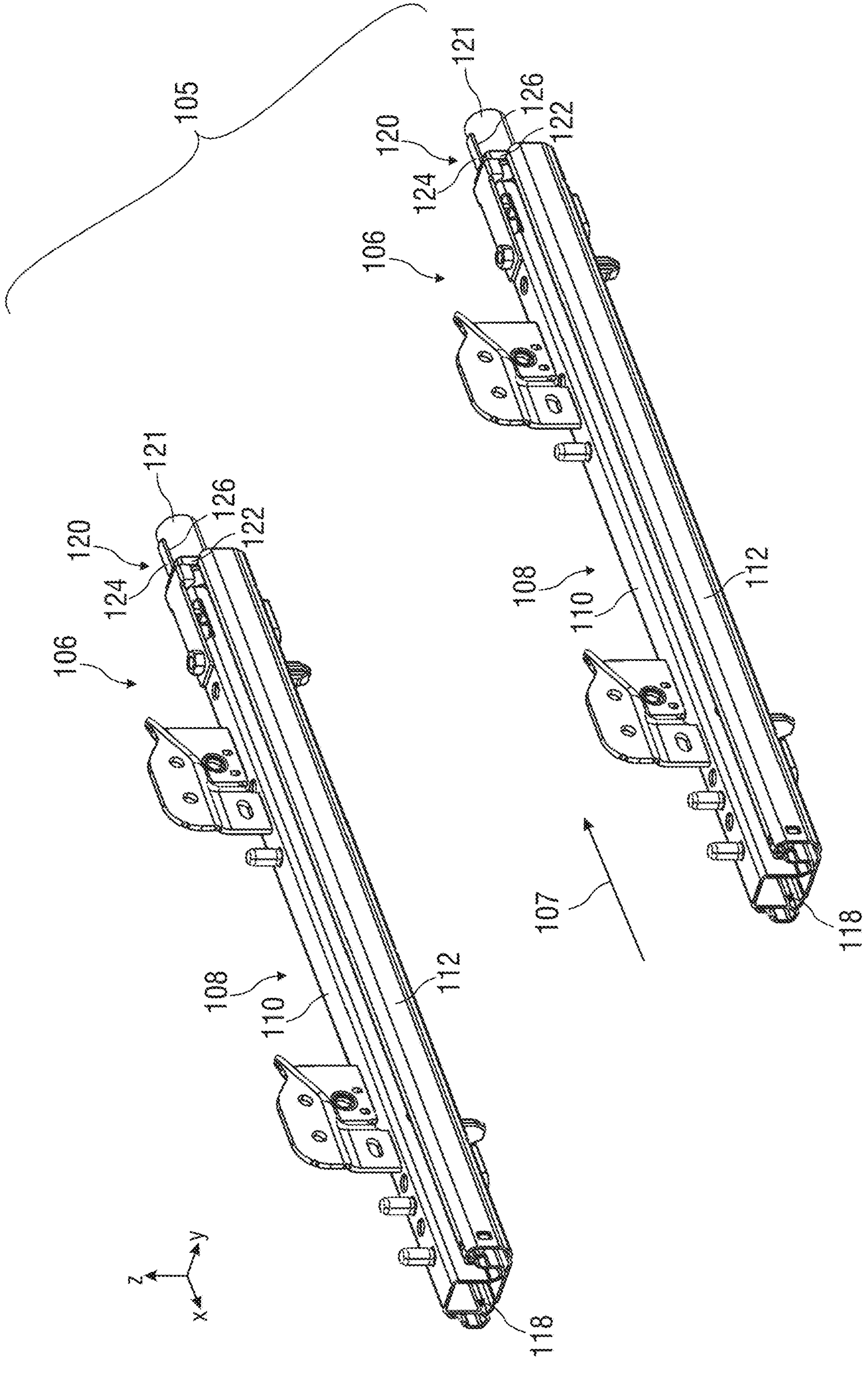
FIG. 2 shows a perspective illustration of a seat longitudinal adjusting mechanism with two longitudinal adjusters according to the invention which are arranged parallel to one another and each have a rail pair.
Figure 3:
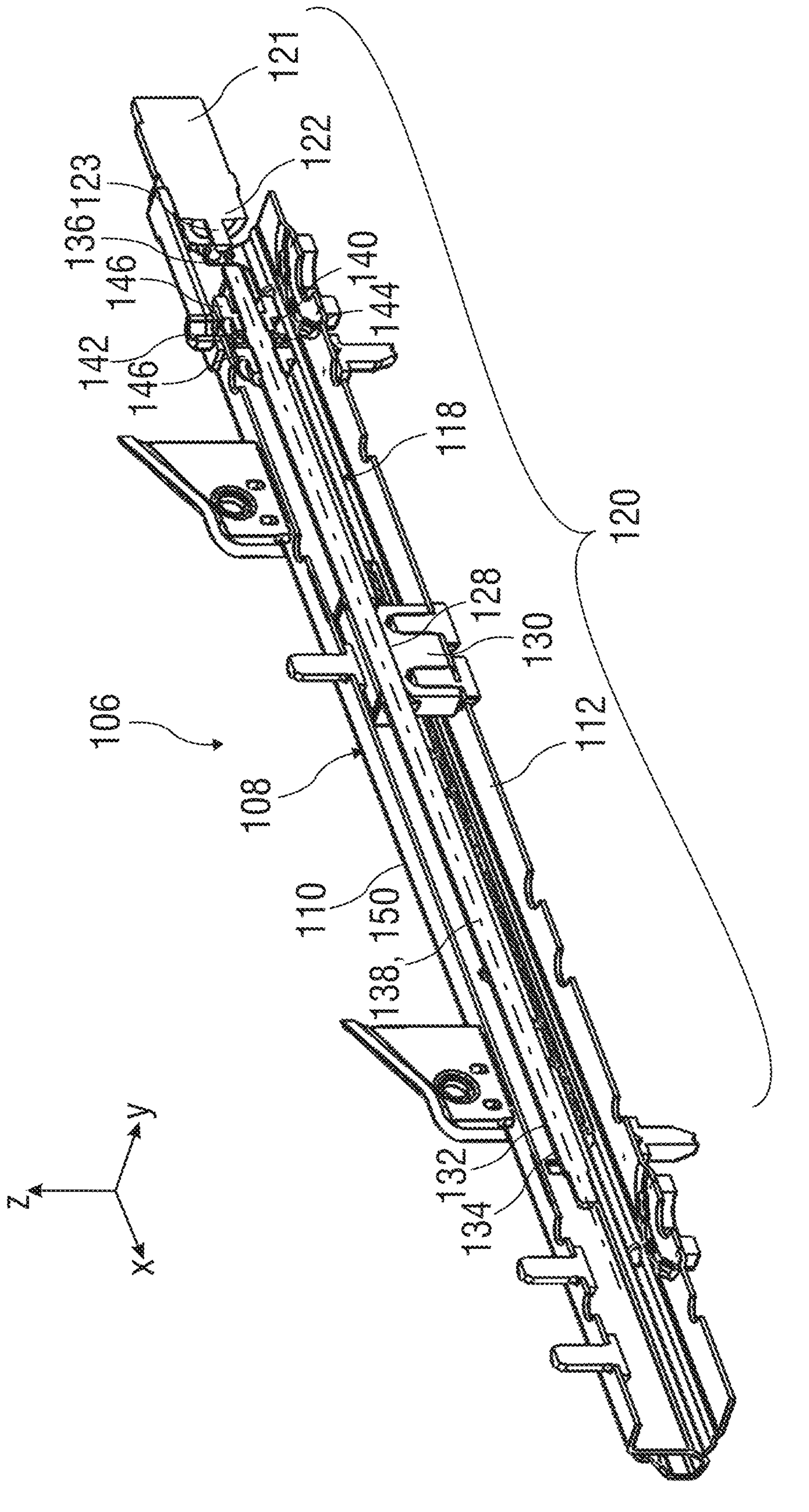
FIG. 3 shows an illustration, cut away along a longitudinal direction, of one of the longitudinal adjusters from FIG. 2.

FIGS. 2 to 3 show the longitudinal adjuster 106 with the rail pair 108. FIG. 2 shows a perspective illustration of a seat longitudinal adjusting mechanism 105 with two identical or structurally identical longitudinal adjusters 106 which are arranged next to one another in parallel, wherein their seat rails 110 are connected to the vehicle seat 100 for the longitudinal adjustment of the latter. The two longitudinal adjusters 106 can be adjustable in a manner which is synchronized with respect to one another, in particular electronically, or else mechanically via flex-shafts. The longitudinal adjusters 106 are oriented in the direction of travel 107 in a manner which is analogous with respect to the vehicle seat 100.

In the following text, on account of the structurally identical design of the longitudinal adjusters 106, the invention will be described for one of the latter.

The respective longitudinal adjuster 106 has a drive device 120 for adjusting the seat rail 110 relative to the floor rail 112. The drive device 120 has at least one motor 121 and a gear unit 122. The drive device 120 is configured as a direct drive.

The gear unit 122 and the motor 121 are arranged at least partially in a cavity 118 which is formed between the seat rail 110 and the floor rail 112.

In the present case, the motor 121 protrudes on the end side at least partially at one end of the seat rail 110 into the latter. As an alternative, the motor 121 can protrude in a manner which is not shown through a cutout in the seat rail 110 in the vertical direction z upward out of the latter, or through the latter. In a further alternative, the gear unit 122 and the motor 121 can be arranged completely within the cavity 118 of the rail pair 108.

In the present case, the gear unit 122 is arranged completely in the cavity 118 which is formed between the seat rail 110 and the floor rail 112. In the present case, the motor 121 and the gear unit 122 are attached together in a front end region of the seat rail 110.

As an alternative, the motor 121 and the gear unit 122 can also be arranged in the rear end region of the seat rail 110. The two end-side arrangements of the motor 121 and the gear unit 122 make simple accessibility of the motor 121 and the gear unit 122 possible, with the result that these components are optionally replaceable or repairable easily even in the case of a longitudinal adjuster 106 which is installed in a vehicle.

In the case of the arrangement of the sliding bush 180 and the ball bearing 144 (shown in FIG. 4), the motor 121 and the gear unit 122 are preferably arranged in the front end region of the seat rail 110.

The gear unit 122 is connectable to the seat rail 110, in particular with a force fit and/or form fit, for example screwed, by a material bond, for example welded by means of a fastening 124 with a seam 126, and/or with a form fit, for example pressed, in order for it to be possible for high forces to be transmitted.

FIG. 3 shows a cut-away longitudinal illustration of the longitudinal adjuster 106.

The drive device 120 is configured, for example, as a spindle drive. The drive device 120 comprises at least the motor 121, the gear unit 122, a spindle block 130 which is fixed with respect to the floor rail 112 or with respect to the seat rail 110 and has an internal thread 128, and a spindle 132 which has an external thread 134 which is operatively connected to the internal thread 128 of the spindle block 130.

The drive device 120 can be based, for example, on a rotating spindle 132, in particular a spindle 132 which is mounted rotatably relative to the seat rail 110, which spindle implements a longitudinal adjustment via a nut, the spindle block 130, which is fastened to the floor rail 112. A required self-locking action between the spindle block 130 and the spindle 132 for the dissipation of load in the case of a crash can be achievable by way of a corresponding (small) lead of the threads (internal thread 128 and external thread 134, in particular trapezoidal thread (for example, Tr8x2)).

Moreover, the drive device 120 comprises a clutch 136 for coupling the motor 121, in particular the gear unit 122, to the spindle 132. The motor 121 is coupled indirectly via the gear unit 122 and the clutch 136 to the spindle bearing 140. The clutch 136 is arranged, in particular, between the spindle 132 and the output shaft 123. The clutch 136 can be a conventional clutch 136 for compensating for tolerances and can be configured, for example, as a compensating clutch or slipping clutch.

The spindle 132 extends along a longitudinal axis in the longitudinal direction x. The spindle 132 is mounted rotatably about a spindle axis 138 in the spindle block 130 and a spindle bearing 140. The gear unit 122, the clutch 136, the spindle 132, the spindle bearing 140 and optionally the motor 121 can be arranged on a common axle 150 within the rail pair 108.

For example, the common axle 150 is arranged in the cavity 118 of the rail pair 108. The common axle 150 is enclosed by the seat rail 110 and the floor rail 112.

The spindle 132 is screwed into and mounted in the spindle block 130 rotatably about the spindle axis 138. In the case of a stationary spindle block 130, wherein it is screwed, in particular, fixedly to the floor rail 112, the spindle 132 is axially movable about the spindle axis 138 along the longitudinal axis.

The spindle 132 is connected fixedly, for example, via the spindle bearing 140 to the seat rail 110, for example screwed by means of a connecting screw 142. As an alternative, the spindle bearing 140 can be, in particular, welded by a material bond to the seat rail 110 or, in particular, pressed with a force fit. The spindle bearing 140 comprises, for example, a ball bearing 144 which can be delimited directly or indirectly on both sides in each case by a spindle nut 146. In the example which is shown, the ball bearing 144 directly adjoins one of the spindle nuts 146 on one side and directly adjoins the bracket 148 on the other side, wherein this bracket 148 directly adjoins the other spindle nut 146.

The motor 121 and the gear unit 122 form, for example, a unit. The motor 121 and the gear unit 122 are configured, for example, as a geared motor unit.

Figure 4:
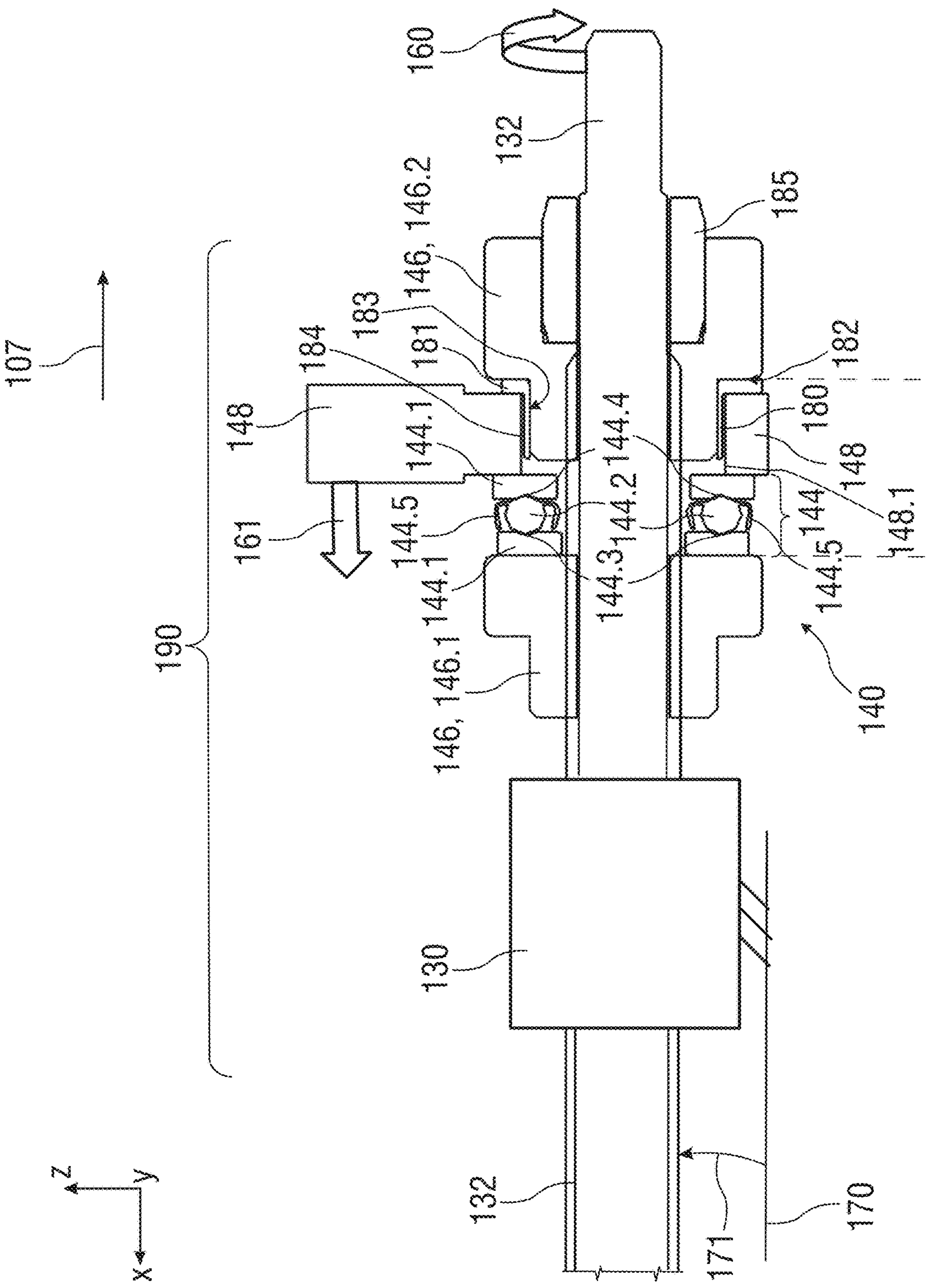
FIG. 4 shows a diagrammatic sectional illustration of a spindle bearing of one of the longitudinal adjusters from FIG. 2.

FIG. 4 shows a diagrammatic sectional illustration of the spindle bearing 140 of one of the longitudinal adjusters 106 from FIG. 2 in detail.

Two spindle nuts 146 (also called single nuts) are provided, between which the spindle bearing 140 is arranged. As an alternative, only one spindle nut 146 can be provided in a way which is not shown in greater detail, instead of two spindle nuts 146. In this example, the spindle 132 is axially delimited only in one direction.

The respective spindle nut 146 is fastened on the spindle 132 and rotates together with the latter according to arrow 160. The spindle 132 is mounted in the spindle block 130 rotatably and axially movably in the longitudinal direction x. The spindle 132 is set in rotation according to arrow 160 by means of the drive device 120, in particular the motor 121 (shown in FIGS. 2 and 3). On account of the stationary spindle block 130, the spindle 132 is linearly or axially movable as a consequence of its rotation along its longitudinal axis in the longitudinal direction x about the spindle axis 138. Here, the adjusting direction of the seat rail 110 changes with the change in the rotational direction.

The spindle bearing 140 is preferably configured as an axial bearing 141 which transmits the linear movement of the spindle 132 to the seat rail 110 (shown in FIGS. 1 to 3).

In the axial direction, the spindle bearing 140 has on one side a ball bearing 144 and on the other side a sliding bush 180 with an axial play 182, in particular a small compensation region, with respect to the spindle nut 146.

As shown in FIG. 4, the sliding bush 180 can be arranged in front of the ball bearing 144, as viewed in the direction of travel 107. A rearward or rear arrangement of this type of the ball bearing 144 has a high efficiency of the longitudinal adjuster 106, with the result that a motor 121 with a small power output can be used. A driver's/passenger's seat is usually inclined, for which reason the ball bearing 144 which is configured as an axial ball bearing is loaded primarily via the downhill slope force.

As an alternative, the ball bearing 144 can be arranged in front of the sliding bush 180 in the direction of travel 107 (not shown). In the case of a displacement of the vehicle seat 100, a rearward arrangement of this type of the sliding bush 180 makes a mechanical synchronization of the two longitudinal adjusters 106 which are arranged parallel to one another possible, in particular of the two movable seat rails 110 of these two longitudinal adjusters 106 (shown in FIG. 2), as has already been stated in the general description. In the case of an embodiment of this type, a motor 121 with a relatively high power output is required.

The spindle bearing 140 which is configured as an axial bearing 141 can be configured not to absorb any radial forces. That is to say, the spindle bearing 140 can be configured only as an axial bearing with the at least one axial play 182 between the spindle nut 146 and the sliding bush 180.

The respective spindle nut 146 is fastened on the spindle 132 such that it cannot rotate. The linear movements of the spindle 132 are transmitted via the spindle bearing 140 which is configured as an axial bearing indirectly via a bracket 148 to the seat rail 110 (shown in FIGS. 1 to 3). The spindle bearing 140 bears, for example, axially and also radially against the bracket 148. Here, the ball bearing 144 bears only axially against the bracket 148. The sliding bush 180 bears both axially by means of its collar 181 and radially by means of a cylindrical sliding portion 183 against the bracket 148.

In particular, the spindle bearing 140 is mounted rotatably on the bracket 148. The bracket 148 is in turn fastened to the seat rail 110 in a way which is conventional and not shown in greater detail. As shown in FIG. 4, a front region of the rail pair 108 can be inclined by approximately 6 degrees with respect to the vehicle floor 170 according to arrow 171. The linear movement of the spindle 132 is initiated or induced, for example, by way of the spindle block 130, in particular a nut. The spindle 132 is screwed through the spindle block 130. The spindle block 130 is, for example, connected fixedly to the floor rail 112, for example screwed (as shown in FIGS. 2 and 3).

In order to absorb and damp or dissipate radial forces which act, the sliding bush 180 can additionally be provided between the respective spindle nut 146 and the bracket 148, and can have the cylindrical sliding portion 183 which is arranged with a radial play 184 with respect to the bracket 148. A sliding bush 180 of this type, in particular a sliding portion 183 of hollow-cylindrical configuration with the collar 181, has neither a prestress in the radial direction nor a prestress in the axial direction or longitudinal direction x.

The linear movement of the spindle 132 is transmitted by way of the spindle bearing 140 as axial bearing to the seat rail 110 (shown in FIGS. 2 and 3) and finally to the vehicle seat 100, in particular the seat part 104 (shown in FIG. 1).

The one component of the spindle bearing 140 bears, in particular configured as a ball bearing 144, against the bracket 148 on one side and against one of the spindle nuts 146 on the other side, in particular axially. The ball bearing 144 can be, in particular, a deep groove ball bearing. The bracket 148 is fastened to a supporting structure or a profile of the seat part 104. Seat forces and occupant forces occur mainly in the indicated direction according to arrow 161. The ball bearing 144 comprises, for example, a bearing cage 144.5 and is arranged between the one spindle nut 146 and the bracket 148, in particular without play. An axial suspension means (also called an axial spring means, not shown) can optionally be provided. An axial suspension means of this type can serve to reduce or eliminate an axial play between the spindle nuts 146, and can be designed, for example, in such a way that an axial load which occurs in the case of a normal adjustment is absorbed by the collar 181 of the sliding bush 180 (shown in FIG. 4).

The spindle bearing 140 is an axial deep groove ball bearing in the thrust direction:

If, for example, the vehicle seat 100, in particular the seat rail 110 (shown in FIGS. 1 to 3), is moved axially rearward along the longitudinal axis in the longitudinal direction x and counter to the direction of travel 107, fewer forces occur between the spindle nuts 146 and the bracket 148 on account of the rearward arrangement of the ball bearing 144. Therefore, the sliding bush 180 which lies at the front in the travel of direction can preferably be used as an axial bearing, without risking high friction forces. An arrangement of this type ensures highly efficient (low-friction) spindle mounting. The lateral forces between the spindle 132 and a holder or bracket 148 are as a rule low. Therefore, the sliding bush 180 is also sufficient for lateral forces.

The spindle bearing 140 as ball bearing 144 comprises, for example, a bearing cage 144.5, in particular two races 144.1, between which balls 144.2 roll on raceways 144.3, 144.4. The raceways 144.3, 144.4 on the two races 144.1 are of identical configuration; in particular, they have approximately identical dimensions and/or an identical shape. One of the races 144.1, in particular that one which corotates with the spindle nut 146, has a smaller diameter for the spindle 132 than that race 144.1 which is connected fixedly to the bracket 148 and does not rotate. As a result, contacts and therefore friction losses as a result of contact can be avoided in the case of a simultaneous relative movement.

The assembly will be described in greater detail in the following text.

The spindle bearing 140 with the spindle nuts 146 and the bracket 148, the spindle 132 and the spindle block 130 can be preassembled to form a preassembled unit 190.

For preassembly of this type, first of all one of the spindle nuts 146, in particular a first spindle nut 146.1, is screwed onto the spindle 132. This spindle nut 146.1 can have a lead deviation, in order to make a press fit on the trapezoidal thread of the spindle 132 possible.

Afterward, the spindle bearing 140, the bracket 148 and the sliding bush 180 are mounted one after another onto the spindle 132. The bracket 148 can be configured, for example, as a supporting bracket or a supporting ring.

Finally, the further spindle nut, in particular a second spindle nut 146.2, is screwed onto the spindle 132, to be precise in such a way that there is always a small axial play 182 in the axial direction, in particular in the longitudinal direction x, in order to reduce the friction between the collar 181 of the sliding bush 180 and the second spindle nut 146.2. This can be achieved, for example, in the manufacturing process, in particular by screwing until tight or screwing until tight and unscrewing by a defined angle, or by other end stops which permit only mounting with play.

The second spindle nut 146.2 is fixed by way of a fixing bush 185 which is pressed in in the axial direction. It prevents a rotation of the second spindle nut 146.2 by way of a frictional fit, and also centering of this second spindle nut 146.2 with respect to the spindle 132 for improved coaxiality.

This preassembled unit 190 can be mounted, for example, in the following sequence into the seat rail 110 (shown in FIGS. 1 to 3):

The spindle block 130 is screwed into the floor rail 112 (shown in FIGS. 1 to 3).

The spindle bearing 140 is connected indirectly via the bracket 148 to the seat rail 110. The bracket 148 is, for example, screwed or riveted to the seat rail 110. A bore (not shown) in the bracket 148 can be configured, for example, as a slot in the vertical direction z, in order to make tolerance compensation possible. Tolerance compensation of this type can be provided in the transverse direction y.

Moreover, the position of the spindle 132 can be defined by way of the positioning of the motor 121 and its fastening to the seat rail 110 (shown in FIGS. 1 to 3).

The axes of the motor 121 and the spindle bearing 140 and the spindle block 130 can be configured so as to be aligned.

Terms used in the claims such as "comprise", "have", "contain", "include" and the like do not rule out further elements or steps. The use of the indefinite article does not rule out a plural.

The features disclosed in the above description, the claims and the figures can be of significance both individually and in combination for the implementation of the invention in its different embodiments, in so far as they remain within the scope of protection of the claims.

LIST OF DESIGNATIONS

100 Vehicle seat
102 Backrest
104 Seat part
105 Seat longitudinal adjusting mechanism
106 Longitudinal adjuster
107 Direction of travel
108 Rail pair
110 Seat rail
112 Floor rail
118 Cavity
120 Drive device
121 Motor
122 Gear unit
123 Output shaft
124 Fastening
126 Seam
128 Internal thread
130 Spindle block
132 Spindle
134 External thread
136 Clutch
138 Spindle axis
140 Spindle bearing
141 Axial bearing
142 Connecting screw
144 Ball bearing
144.1 Race
144.2 Ball
144.3 Raceway
144.4 Raceway
144.5 Bearing cage
146 Spindle nut
146.1 First spindle nut
146.2 Second spindle nut
148 Bracket
148.1 Through opening
150 Common axle
160 Arrow
161 Arrow
170 Vehicle floor
171 Arrow
180 Sliding bush
181 Collar
182 Axial play
183 Sliding portion
184 Radial play
185 Fixing bush
190 Preassembled unit
x Longitudinal direction
y Lateral direction
z Vertical direction

The invention claimed is:

1. A longitudinal adjuster, comprising:

one rail pair and a drive device for the rail pair, wherein the rail pair comprises a first rail and a second rail which are displaceable relative to one another, wherein the drive device has at least one motor, a gear unit, a spindle block which has an internal thread and is fixed to the first rail or second rail, a spindle with an external thread which is operatively connected to the internal thread of the spindle block, and a spindle bearing, wherein the spindle extends along a longitudinal axis and is mounted in the spindle block and the spindle bearing such that it is rotatable about a spindle axis, wherein the spindle bearing has at least one spindle nut which is fastened on the spindle and rotates with the spindle, wherein the spindle bearing is configured as an axial bearing which transmits a linear movement of the spindle to the first rail, and wherein the spindle bearing has, in the axial direction, on one side of the spindle nut a ball bearing and on the other side of the spindle nut a sliding bush with an axial play on at least one of the two sides with respect to the spindle nut.

2. The longitudinal adjuster as claimed in claim 1, wherein the sliding bush is arranged in front of the ball bearing.

3. The longitudinal adjuster as claimed in claim 1, wherein the spindle bearing transmits the linear movement of the spindle directly to the first rail.

4. The longitudinal adjuster as claimed in claim 3, wherein the spindle bearing is arranged between the spindle nut and the first rail.

5. The longitudinal adjuster as claimed in claim 1, wherein the spindle bearing transmits the linear movement of the spindle to the first rail indirectly via a bracket.

6. The longitudinal adjuster as claimed in claim 5, wherein the spindle bearing is mounted rotatably on the bracket.

7. The longitudinal adjuster as claimed in claim 6, wherein the spindle bearing is arranged between the spindle nut and the bracket.

8. The longitudinal adjuster as claimed in claim 5, wherein the sliding bush is arranged between the spindle nut and the bracket.

9. The longitudinal adjuster as claimed in claim 8, wherein the sliding bush is arranged without stress in the axial direction and radial direction between the spindle nut and the bracket.

10. The longitudinal adjuster as claimed in claim 5, wherein the ball bearing is arranged between the spindle nut and the bracket in a preloaded manner by means of a spring element.

11. The longitudinal adjuster as claimed claim 5, wherein the bracket has a through opening, into which the sliding bush is pushed in such a way that the axial play between the sliding bush and the spindle nut is settable or is set.

12. The longitudinal adjuster as claimed in claim 1, wherein at least two spindle nuts are provided, wherein, in the case of two spindle nuts, the spindle bearing comprising the sliding bush and the ball bearing is arranged between the two spindle nuts.

13. The longitudinal adjuster as claimed in claim 12, wherein, in the case of two spindle nuts, a spacing between the two spindle nuts is constant.

14. The longitudinal adjuster as claimed in claim 12, wherein, in the case of two spindle nuts, the ball bearing is arranged between one of the two spindle nuts and the bracket.

15. A vehicle seat with at least one longitudinal adjuster as claimed in claim 1.

* * * * *